Jan. 10, 1939.  W. W. HARTMAN  2,143,242
BAND BLADE SLICING MACHINE
Filed Nov. 24, 1936  6 Sheets-Sheet 1
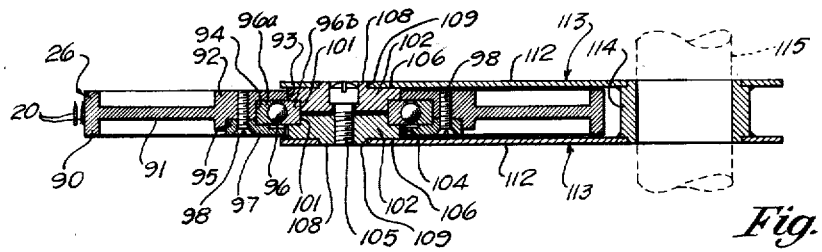
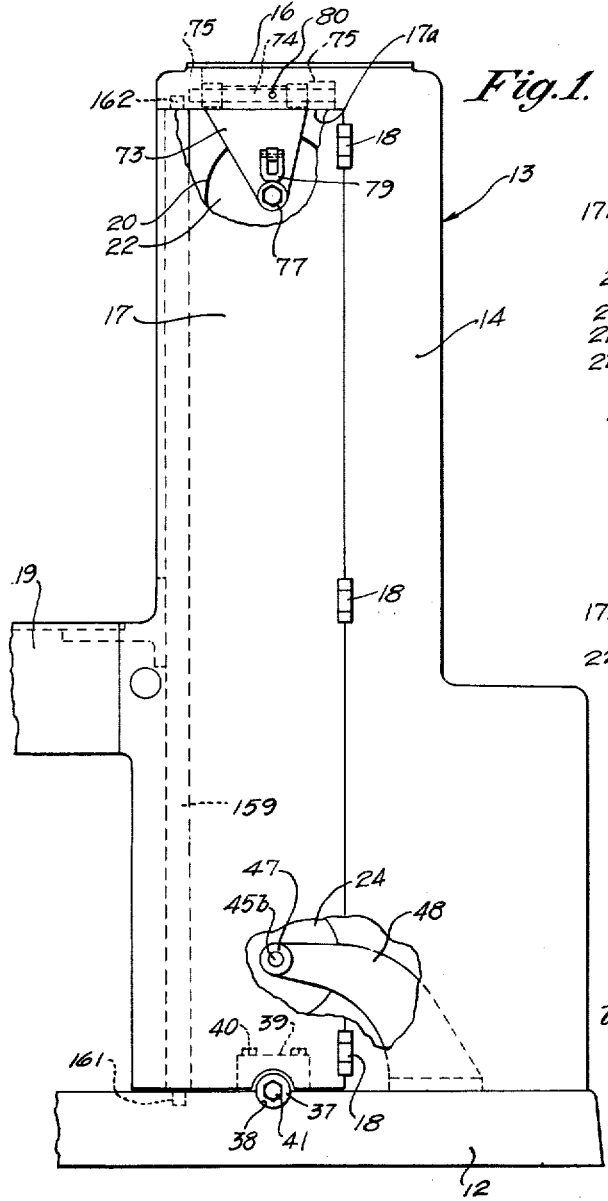
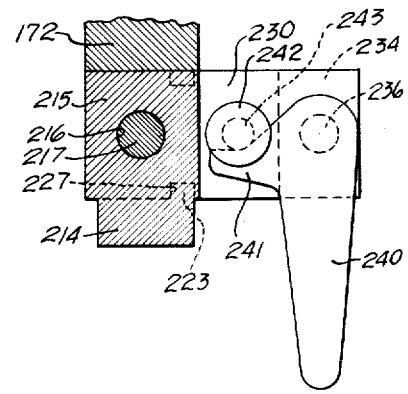
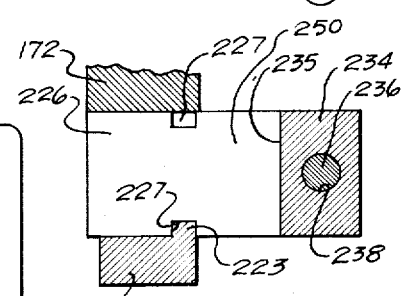
Inventor
William Walter Hartman.
Attorney.

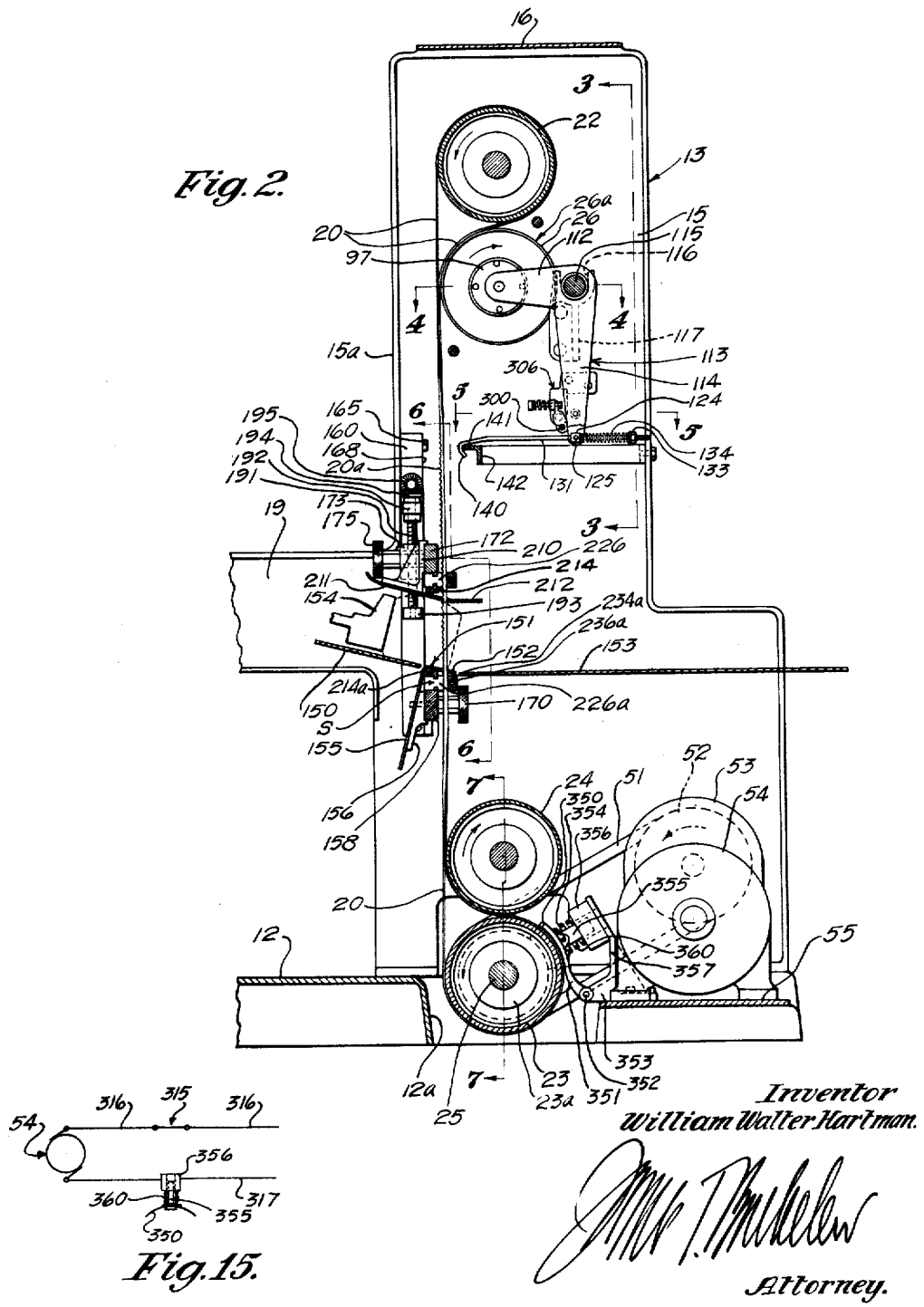

Inventor
William Walter Hartman.

Attorney.

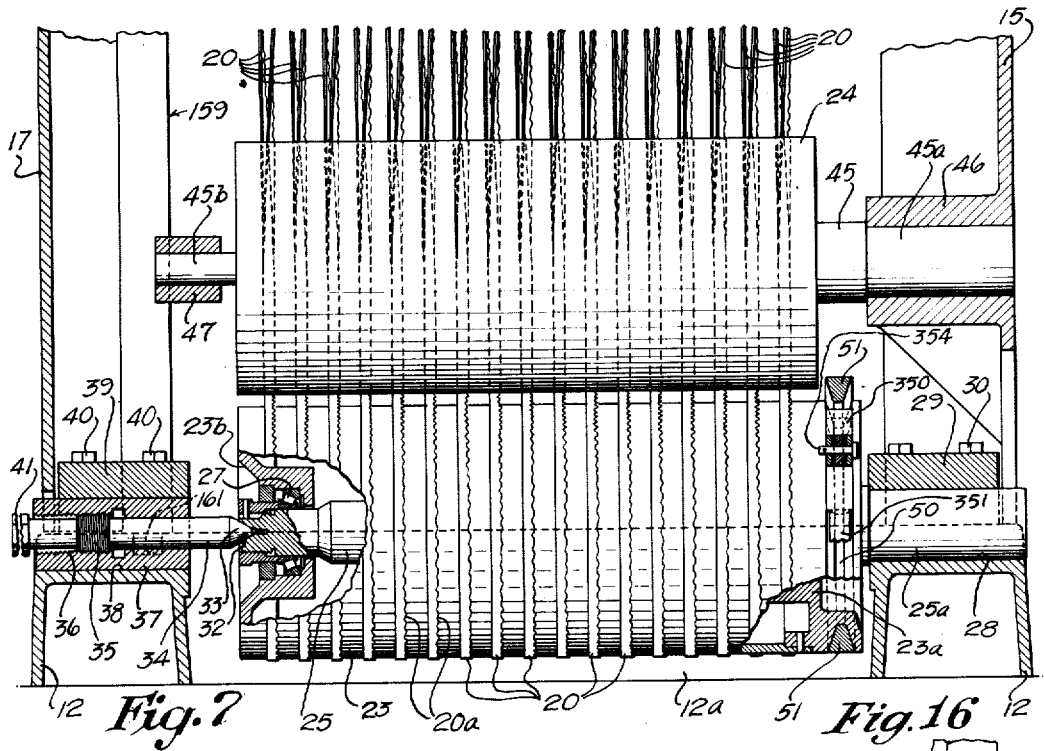
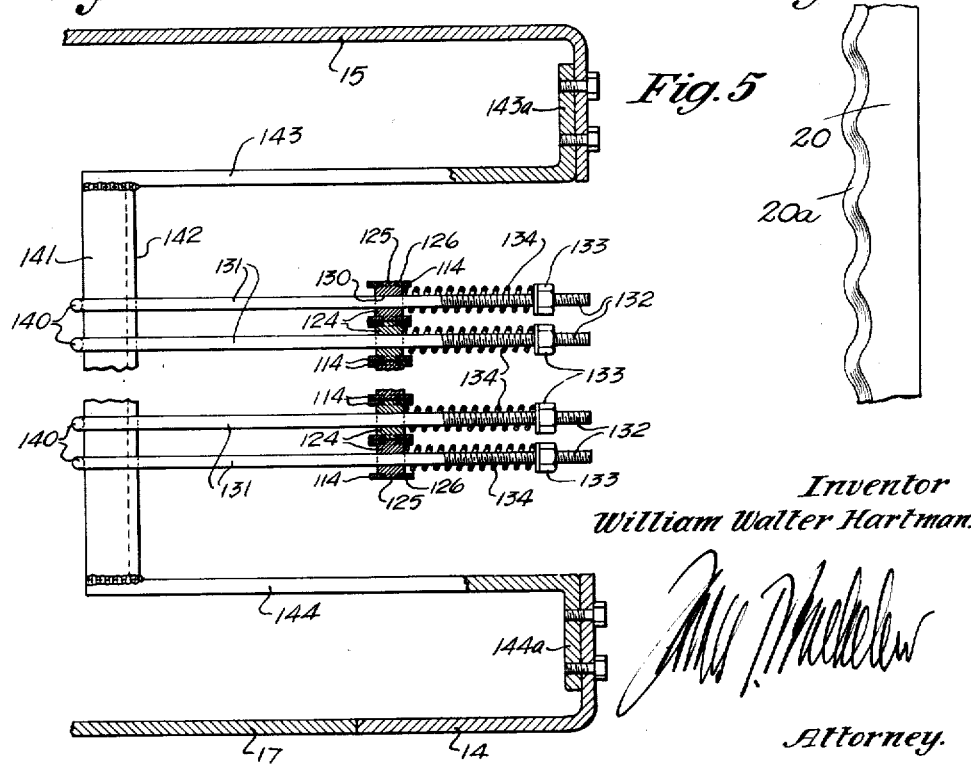

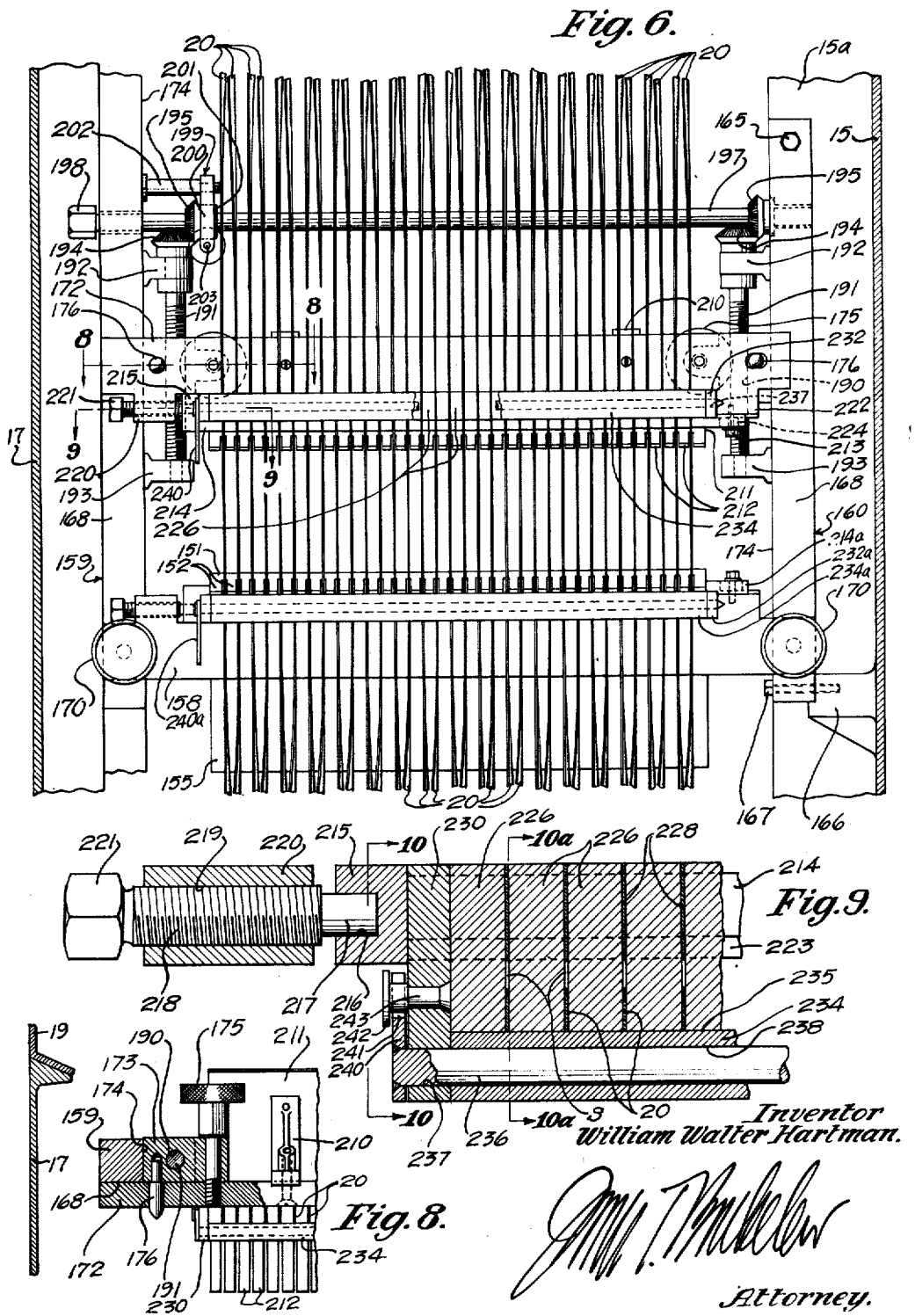

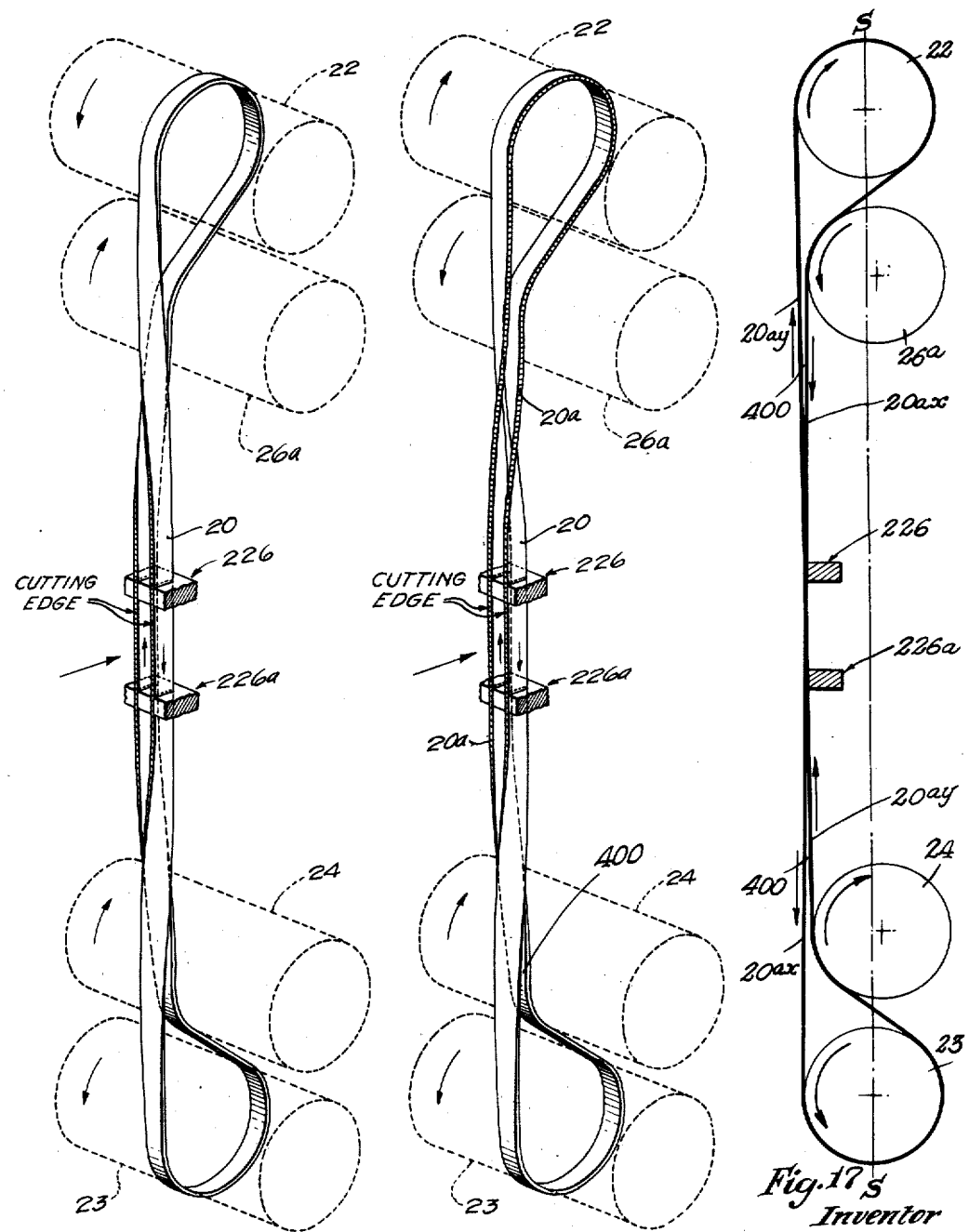

Patented Jan. 10, 1939

2,143,242

UNITED STATES PATENT OFFICE 2,143,242

BAND BLADE SLICING MACHINE

William Walter Hartman, Los Angeles, Calif.

Application November 24, 1936, Serial No. 112,539

15 Claims. (Cl. 146—88)

This invention relates generally to machines for slicing loaves of bread, or other articles, and deals more particularly with the bandblade type of slicer.

The cutting mechanism of the usual bread slicer machine as known heretofore has involved a series of reciprocating knives. These knives do not have a perfectly clean cutting action owing to the fact that they stop and reverse their direction while the loaf is being continually moved forwardly therethrough. The loaf continues to be passed forwardly while the knives are decelerating, reversing direction and again accelerating, and the effectiveness of the cutting action suffers accordingly. The band blade type of machine involves a series of blades of the endless band type, and these blades may easily be driven at a constant uniform speed which is much higher than the maximum possible in the reciprocating type of machine. The result is a much cleaner cut, as well as increased speed of slicing.

It is the primary object of the present invention to provide a slicing machine of the band blade type which is improved as regards simplification of construction, ease of adjustment, increased slicing capacity, also cleaner, smoother and more uniform slicing, with less crushing of the loaves, and with long life of the parts.

A further object of the invention is to provide means for individually tensioning the band blades, such that if the bands are of slightly varying lengths, they can nevertheless be individually tensioned on the machine.

A still further object of the invention is to provide a machine in which the blades can be very conveniently threaded through the machine.

An additional object of the invention is to provide means for instantly arresting operation of the machine in the event of breakage of any one of the band blades.

An additional object of this invention is to bring into association a plurality of endless band blades mounted side by side about rotatable drums, and means for guiding all the courses of substantially all said endless band blades between said drums to run in spaced parallel slicing planes with the cutting edges of all the courses of substantially all the blades approximately parallel and approximately in a common plane.

An additional object of this invention is to associate rotatable blade supporting drums, a plurality of endless band blades, blade twisting means, and rotatable blade deflecting guide drums, in such manner that the two courses of substantially all the blades are drawn relatively together, whereby all the blade courses are enabled to cooperate in the slicing action in a desirable practical manner, and whereby in a machine of practical size and proportions, the following important improvements are procured: (a) when the popular ram type feeder is used, it is possible because of the drawing together of the blade courses by the blade deflecting guide drums, to shorten the ram stroke needed to feed articles completely through the blades, and by so shortening the ram stroke the hourly slicing capacity of the machine can be increased without changing the rate of feed through the blades: (b) by drawing all the blade courses relatively close together by means of the blade deflecting guide drums, the tendency of the blade courses to crush or compress soft articles, such as loaves of bread, during the slicing, is noticeably decreased, and (c) when the blade deflecting guide drums sufficiently deflect the blade courses to make them parallel, and to bring their cutting edges all into a common plane, then the foregoing objects and benefits (a) and (b) of my invention are procured in maximum degree.

Other objects, benefits and features of my invention will become apparent through inspection of the drawings, and through consideration of the following description and of the claims.

While my invention can take various forms and embodiments, and is subject to modification, to suit special desires or requirements, it is thought that my invention can be best understood without further preliminary discussion, by referring now to the following detailed description of a present preferred embodiment thereof, reference being made to the accompanying drawings, in which:

Fig. 1 is a side elevation of a slicing machine embodying the present invention;

Fig. 2 is a vertical medial section of the slicing machine, being taken on a plane parallel to the plane of the paper in Fig. 1;

Fig. 4 is a horizontal section taken on line 4—4 of Fig. 2;

Fig. 5 is a section taken on line 5—5 of Fig. 2;

Fig. 6 is a section taken on broken line 6—6 of Fig. 2;

Fig. 7 is a vertical section taken on line 7—7 of Fig. 2;

Fig. 8 is a detail section taken on line 8—8 of Fig. 6;

Fig. 9 is a detail section taken on line 9—9 of Fig. 6;

Figure 3:
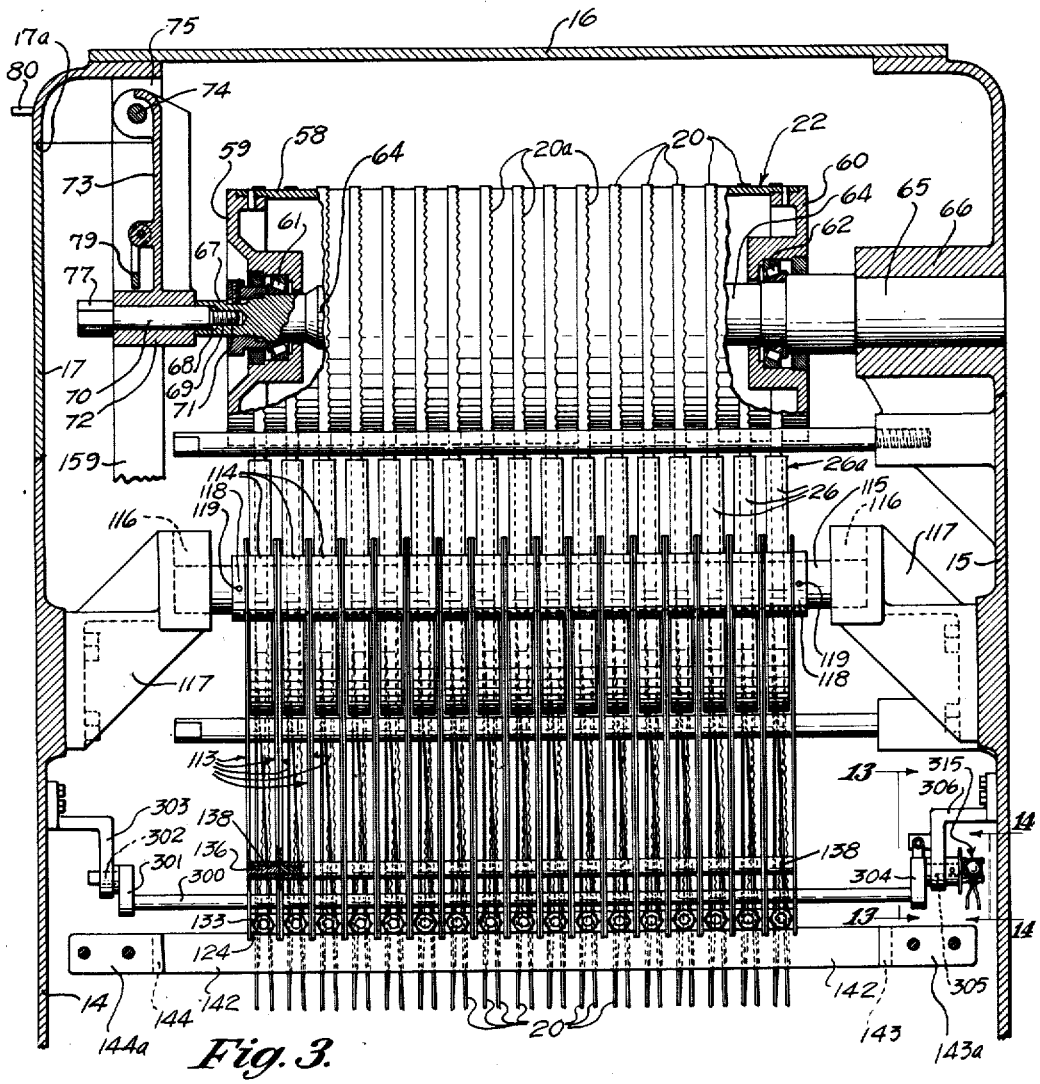
Fig. 3 is a section taken on line 3—3 of Fig. 2.
Figure 13:
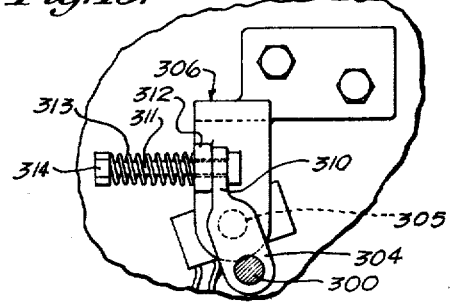
Figure 14:

Figs. 10 and 10a are sections taken as indicated by lines 10—10 and 10a—10a of Fig. 9;

Fig. 11 is a diagrammatic perspective showing one manner of threading the band blades in the machine;

Fig. 12 is a diagrammatic perspective showing an alternative manner of threading the band blades in the machine;

Fig. 13 is a detail taken as indicated by arrows 13—13 of Fig. 3;

Fig. 14 is a detail taken as indicated by arrows 14—14 of Fig. 3;

Fig. 15 is an electrical diagram showing a typical electrical circuit connecting the drive motor, brake, and safety control switch;

Fig. 16 is a detail of a portion of a typical band blade; and

Fig. 17 is a diagrammatic view illustrating the general form of my invention indicated in Fig. 12, looking at the parts in a direction parallel to the axes of the blade supporting drums, the cutting edge of the blade only being indicated in order to avoid confusion.

In the various above described drawings, like parts are designated by like reference numerals.

The general frame structure of the machine includes base 12, and mounted on this base is a frame 13 having sides 14 and 15 and top 16, the frame being open at the front and at the rear. Frame side 14 is provided with a swinging door 17, extending from base 12 substantially to top 16, said door being hinged as at 18. Extending forwardly from frame sides 14 and 15 is a projection 19 which supports certain in feed mechanism not necessary here to illustrate.

A series of endless bands or band blades 20 are provided, and these blades may typically be one-half inch in width and .015 inch in thickness. In the present embodiment of the invention, each of these blades is substantially 12 feet in length the endless blade being formed by beveling and overlapping the two ends of the original straight blade and then brazing to form a flush joint, or by butt welding, so that the connection is of substantially the same thickness as the blade itself.

The band blades may be threaded on the machine in two different ways, either as diagrammed in Fig. 11, or as diagrammed in Fig. 12. The invention will first be described in the form in which the blades are arranged as indicated in Fig. 11.

Endless blades 20 are looped over and mounted about upper and lower band blade supporting drums 22 and 23, respectively, which as here illustrated are of the same diameter and have their axes substantially parallel and in the same vertical plane. Just above lower drum 23 is a blade deflecting guide drum 24 which engages the blades rising from lower drum 23, which in the present embodiment rotates left-handedly, as viewed in the drawings. The blades thus move downwardly in a vertical plane from drum 22 to drum 23, and the blade deflecting guide drum 24 is so positioned as to guide the lower portions of the blades to rise in substantially the same vertical plane, which may in a general way be referred to as the cutting plane of the machine.

Below upper drum 22 is a segmented blade deflecting guide drum 26a consisting of a series or row of individual drums or rolls 26, the peripheries of which engage the blades moving upwardly from lower idler drum 24 toward upper drum 22, said individual drums or rolls 26 being so positioned as to support the blades substantially in said cutting plane.

Both the upwardly moving and the downwardly moving course of each blade is twisted preferably through a quarter turn and then back again, into what may be termed parallel slicing planes, between the upper and lower drums, so as to present the cutting edge 20a of the blade toward the article to be sliced, which is fed toward the blades in a direction parallel to the slicing planes as indicated in Fig. 2, and as indicated by the arrow in Fig. 11. The means for so twisting and guiding the blades will be set forth at a later point in the specification.

Lower drum 23 is mounted as low in the machine as possible. For this purpose, base member 12 is formed with an opening 12a adapted to receive the lower half of said drum, as clearly appears from Figs. 2 and 7. This drum 23 has ends 23a and 23b which are mounted for rotation on a non-rotatable shaft 25, suitable bearings being provided between the drum ends and said shaft, as indicated for instance at 27 in Fig. 7. Shaft 25 has one end 25a securely fastened to the frame structure, i. e. on base 12 in a half cylindric seat, as at 28, being secured in position by a block 29, the latter being held in place by screws 30. The entire weight of the drum is supported at this one end of shaft 25. The other end of shaft 25 is formed with a conical recess 32 adapted to receive the pointed end 33 of a centering shaft 34, said shaft 34 being externally screwthreaded at 35 and being screwed within the internally screwthreaded bore 36 of a supporting member 37, the latter itself being supported in the adjacent frame structure. This member 37 is cylindrical in external shape, and rests in a half cylindrical seat 38 formed in the top side of base 12, being held in position by means of a block 39 secured to the base as by screws 40. The outer end of shaft 34 has a hexagonal head 41 which is turned to screw the shaft into and out of engagement with drum shaft 25 to thereby make these two members separable from each other. This shaft 34 serves to steady the drum shaft 25, and thereby cooperates in more firmly supporting drum 23, especially during operation of the machine. When a new blade is to be threaded around drum 23, shaft 34 is backed away, so that the endless blade can be moved down through the clearance provided between its pointed end and the end of the drum and then moved on over the drum into normal operating position.

The inner end 23a of drum 23 is formed with a peripheral V-groove 50 for a driving belt 51 driven by a pulley 52, the latter being driven through reduction gear set 53 from the drive shaft of an electric motor 54 mounted at 55 on base 12.

Drum 24 is mounted for rotation on shaft 45 in a manner similar to the mounting of drums 22 and 23. One end 45a of the shaft is mounted in a tubular boss 46 formed integrally with frame side wall 15, and the other end 45b is mounted in a bearing 47 on the end of a bracket 48 (see Fig. 1) mounted on base 12 at a point to the rear of lower drum 23.

Upper drum 22 consists of a cylindric shell 58 mounted on drum ends 59 and 60, which are in turn rotatably mounted by means of bearings 61 and 62, respectively, on a non-rotatable shaft 64. The inner end 65 of shaft 64 is mounted in a tubular boss 66 formed integrally with frame side wall 15. The outer end 67 of shaft 64 is drilled with an axial bore 68 and with a reduced axial bore 69, the latter being internally screwthreaded. A shaft 70 of a diameter such as to be received within bore 68 and having a reduced screwthreaded end 71 adapted to be screw-threaded within bore 69 is rotatably mounted in a bearing 72 carried by the lower end of a hanger 73 pivotally mounted on a horizontal pin 74 which is supported at right angles to shaft 70 by means of lugs 75 formed integrally with the upper portion of the frame. The outer end of shaft 70 has a hexagonal head 77 by means of which said shaft may be screwed into or backed out of engagement with the screwthreaded socket in the end of shaft 64 thereby making these two members separable. When it is desired to place a new blade in the machine, side door 17 is swung open, and this shaft 70 is then backed out of engagement with shaft 64, after which hanger 73 is swung outwardly and upwardly and is temporarily secured in an upper position by engaging a loop 79 carried by the hanger over a pin 80 mounted on frame wall 14 above door opening 17a. The hanger when placed in such position does not interfere with the operation of placing the new blade on over the upper drum.

I will now describe the individual rotatable drums 26, and one form of the individually movable blade tensioning assemblies on which these drums are mounted and of which they form a part. In that form of my invention which I have illustrated and am describing in detail, I have as previously indicated, selected one of the blade deflecting drums, i. e., drum 26a, to be segmented into these individual drums, and therefore in this embodiment of my invention the drums 26 are both blade deflecting guide drums and also blade tensioning drums.

As best seen in Figs. 4 and 11, the drum 26 is made up of a rim 90, whose periphery is adapted to engage the blade below drum 22, and a web 91 and hub 92. Hub 92 is formed with an axial bore 93, a counter bore 94 and a still larger counter bore 95. A roller bearing 96, having outer and inner race rings 96a and 96b, is placed within counter bore 94 and is confined in position by means of a circular retainer plate 97 received within counter bore 95 and secured in position by screws 98. The inner race ring 96b of bearing 96 is mounted on outwardly facing annular shoulders 101 formed on a pair of discs 102, one of which is received within bore 93 and the other within a circular opening 104 in retainer plate 97. Discs 102 are secured together and pressed against the sides of race ring 96b by means of a screw 105. The flat outer faces 106 of discs 102 are provided with trunnions 108 which are received in circular openings 109 formed in the ends of arms 112 of swinging bell cranks 113. The drum 26 is thus rotatable on bearing 96, which in turn is supported by swinging bell crank arms 112.

The two bell crank arms 112 supporting each roller 26 extend rearwardly in a horizontal direction to a bell crank hub 114, to which they are welded, and which is rotatably mounted on a horizontal shaft 115. Shaft 115 is removably received at its two ends in saddles 116 formed on the ends of mounting brackets 117 mounted on opposite side walls of the frame (see Figs. 2 and 3).

The band rollers 26 and their supporting bell crank arms 112 are thus positioned closely adjacent to one another, the pairs of arms 112 supporting each roller 26 being independently rotatably mounted on supporting shaft 115. As shown in Fig. 3, the arms 112 supporting adjacent rollers 26 come against one another, and the series of hubs 114 supporting said arms are positioned on shaft 115 by means of collars 118 and pins 119 securing said collars in position on the shaft.

The number and thickness of individual rollers 26, which governs the number and spacing of the blades, obviously depends upon the maximum length of loaf to be sliced, and upon the thickness of slice desired.

In assembling the machine, drums 26 are assembled with their bell cranks 113 and placed upon shaft 115, and said shaft and drums are then placed in the machine by lowering the ends of shaft 115 into supporting saddles 116. Lower centering shaft 34 being at this time backed out of engagement with lower drum shaft 25, and upper centering shaft 70 being disengaged and its hanger 73 being hooked up on pin 80, the individual endless band blades are then placed over upper and lower drums 22 and 23 and are spaced thereon side by side transversely of the machine, to correspond with individual drum rollers 26 below upper drum 22. Thus each band blade in passing to or from upper drum 22 engages the periphery of one of these individual rollers 26. After the blades are in position, they are tensioned by swinging bell cranks 113 in a right-handed direction, as viewed in Fig. 2, thereby lifting the rolls 26 into engagement with the blades just below rollers 22. The blades are separately tensioned by individual tensioning means applied to each bell crank.

As a typical and preferred tensioning means, a block 124 is provided between the lower ends of each pair of lower bell crank arms 114, and this block 124 is provided with trunnions 125 rotatably received in circular openings 126 in arms 114. Slidable through a bore 130 in block 124 is a tension rod 131. The rearward end of this rod is threaded, as at 132, and screwthreaded thereon is a tension adjustment nut 133, which engages one end of a compression spring 134 encircling rod 131 and engaging at its other end against block 124. The pairs of bell crank arms 114 are rigidly secured together just above blocks 124 by means of pins 136 tightly mounted at its ends in arms 114 and spacer sleeves 138 placed on pins 136 between arms 114, as indicated in Fig. 3. The forward end of each tension rod 131 is formed with a hook 140 adapted to engage over the flange 141 of an angle iron member 142 which is welded between brackets 143 and 144 secured to the frame, as indicated at 143a and 144a (Fig. 5).

Each blade is tensioned by hooking its corresponding tension rod 131 over flange 141 and then, if necessary, adjusting compression spring 134 by adjustment of nut 133. Thus each blade is individually tensioned, and even though the length of individual blades may vary somewhat, they may be brought to equal tensions by proper adjustment of nuts 133.

In the event that a blade should break, rods 131 are unhooked from flange 141, which allows the tensioning rollers 26 to drop, the bell cranks supporting said rollers swinging counterclockwise as viewed in Fig. 2. A new blade is then placed in the machine, in the manner previously described, after which the blades are again tensioned by first hooking rods 131 back over flange 141 and then suitably adjusting the nut 133 corresponding to the new blade.

In view of the action of drum 26 in continuously tensioning its blade, which action in this instance is set up by spring 134, and since the tensioned blade itself sets up the only restraint against the movement of the parts under the actuating influence of spring 134, I refer to the entire assembly as a self-actuating blade tensioning assembly or mounting.

It has previously been mentioned that the upwardly and downwardly moving course of each endless blade is twisted through a quarter turn in order to present the toothed edges of the blades against the advancing loaves. The infeed mechanism for advancing the loaves and forcing them through the blades may be of any desired or conventional type and is therefore not illustrated in detail in the drawings; a plate or table for supporting the loaves as they are advanced toward the blades is, however, indicated at 150, and is shown as positioned to support the loaves substantially midway between the upper and lower blade drums. As here shown, this infeed loaf supporting plate 150 is inclined downwardly at a suitable angle, so that an upper corner of the loaf is presented first to the vertically moving blades. This method of moving the loaves against the blades is well understood to be of advantage as compared with presenting the flat side of the loaf to the knives, in that a cleaner starting cut is made in the loaf and deformation of the loaf as the cut is started is minimized.

A plate 151 is provided to support the loaves as they pass through the blades, this plate being disposed in the same inclined plane as plate 150, and being provided with forwardly projecting fingers 152 which extend in between the blades. From fingers 152, the loaf moves on to a horizontal outfeed support or conveyor of any desired type, here generally designated at 153.

The loaf to be sliced may be moved forwardly from plate 150 onto plate 151 and through the blades by any suitable means, as preferably a ram indicated in dotted lines at 154. Since such loaf feeding means are well known, no detailed description thereof will be required herein.

Loaf support plate 151 has a portion 155 extending downwardly at right angles to portion 151, and this plate portion 155 is secured through mountings 156 against a transverse plate 158 secured at its ends to vertical supporting bars 159 and 160. Bar 159, which is rectangular in cross-section (Fig. 8) is spaced just within side door 17 and somewhat ahead of the cutting plane defined by the vertically moving blades, being mounted at its lower end on base 12, as at 161 (Fig. 1), and at its upper end on side frame plate 14 just above the opening for door 17, as indicated at 162. The other bar 160 is directly across from bar 159 and is spaced within the opposite frame side 15 (Fig. 6). This frame bar is shorter in length than bar 159, and is mounted at its upper end against a flange 15a turned inwardly from the forward edge of frame side 15, being secured to said flange as by screw 165, and is mounted at its lower end against a boss 166 extending inwardly from frame side 15, being secured thereto as by screw 167. The previously described cross plate 158 is secured against the rearward surfaces 168 of bars 159 and 160 by means of manually operable screws 170.

Above cross plate 158 is a second cross plate 172, the ends of which engage faces 168 of bars 159 and 160. This plate 172, however, is not stationarily secured to bars 159 and 160, but is vertically adjustable thereon. Thus, plate 172 is provided with blocks 173 adapted to fit between and slidably engage the inner faces 174 of bars 159 and 160, plate 172 being removably secured to blocks 173 by means of manually operable screws 175 and dowel pins 176.

Blocks 173 are provided with vertical screw-threaded bores 190 which receive vertical lead screws 191 supported by and adapted to turn in upper and lower bearings 192 and 193, respectively, mounted on the inner faces 174 of bars 159 and 160. The upper ends of these lead screws carry bevel gears 194 which mesh with bevel gears 195 mounted on a horizontal transverse shaft 197 which is journalled at its two ends in frame bars 159 and 160, being provided at its end adjacent side door 17 with a hexagonal head 198 by means of which it may be rotated by a suitable wrench.

A clamp device 199 is provided comprising a split yoke 200 encircling the hub 201 of bevel gear 195 and supported by a post 202 mounted on frame bar 174, said yoke having a clamp screw 203 adapted to be set up to clamp the yoke about the hub of the gear.

Secured to the forward face of upper cross plate 172 is a pair of brackets 210 which carry a loaf hold-down plate 211. This plate 211, which is inclined at the same angle as loaf supporting plates 150 and 151, is provided with fingers 212 projecting between the knives so as to hold the loaf down while being sliced.

Adjustment to loaves of different heights is made by first loosening clamp 199, and then elevating or lowering plate 211 and its carrying member 172 by suitable rotation of shaft 197 which drives lead screws 191 engaging the blocks 173 to which said member 172 is attached.

Mounted in spaced relation below plate 172 is a bar 214, one end of which engages the underside of a downward projection 222 on member 172 (Fig. 6) and is provided with an elongated slot 224 receiving a screw 213 threaded into projection 222. Screw 213 is not tightly set up, permitting relative movement between bar 214 and projection 222. The other end of bar 214 has an upward projection 215 which engages the lower edge of plate 172, and which is provided with a socket 216 adapted to receive the extremity 217 of a pin 218 screwthreaded within a screwthreaded bore 219 formed in a downward projection 220 on the corresponding end of plate 172. Pin 218 has a head 221 provided with suitable wrench faces, as indicated. Bar 214 may thus be removed from the machine by backing off pin 218 and removing screw 213.

Bar 214 has along its edge nearest the blades an upwardly extending key 223 (see Fig. 11). Mounted on this bar 214 is a series of blade guide blocks 226, the upper and lower edges of which are formed half way between the ends of the blocks with key ways 227 adapted to receive keys 223. These blocks, which as so mounted extend toward and between the blades, are snugly received and supported between the lower edge of plate 172 and the upper surface of bar 214. Spacers 228 are placed between the blocks (see Fig. 9), and space the blocks apart a distance very slightly greater than the thickness of the blades. For instance, if a blade of .015 inch in thickness is to be used, these spacers may be .018 inch in thickness. The blades travel through these spaces between adjacent guide blocks, as illustrated.

Between this series of blocks and the upward projection 215 of bar 214 is a plate 230, which projects beyond blocks 226, as shown in Fig. 9. This block also has a key way 227 adapted to receive key 223. At the other end of the row of blocks is a similar plate 232, which comes between the adjacent block and the downward projection 222 of plate 172. Between the projecting ends of plates 230 and 232 is a bar 234 of rectangular cross section, the flat inner surface 235 of which engages the corresponding end surfaces of blocks 226. This bar 234 is held in position by means of a long pin 236 extending through bores 237 in the ends of plates 230 and 232 and through a longitudinal bore 238 formed in bar 234. Pin 236 has on its end, just outside plate 230, a handle member 240 by which it may be inserted and removed from assembly with plates 230 and 232 and bar 234, and this handle member has a projection 241 adapted to be engaged under the head 242 of a pin 243 mounted in plate 230 to lock the pin releasably in position after the blocks are assembled and the pin is in place. When the guide blocks are to be disassembled, handle 240 is simply thrown to one side to disengage projection 241 from pin head 242, and is then pulled outwardly to remove the pin, after which backing out of pin 218 and removal of screw 213 disconnects bar 214, which may then be lowered and blocks 226 removed or changed in position.

An exactly similar set of guide blocks 226a is mounted between lower cross plate 158 and a bar 214a, which is exactly like upper block supporting bar 218 except for being inverted and mounted above its corresponding cross plate 158. Means similar to those used for releasably supporting guide blocks 226 are provided for the support of guide blocks 226a, and are designated by corresponding numerals with the letter a added. The blades spaces between guide blocks 226a are of course in exact vertical alinement with the spaces between upper guide blocks 226, so as to hold the portions of the blades between the upper and lower blocks in vertical planes parallel to the direction of movement of the oncoming loaves.

As will be evident from Fig. 2, upper guide blocks 226 are just above loaf hold down plate 211, and lower guide blocks 226a are just below loaf bottom guide plate 151. There are twice as many pairs of upper and lower guide blocks 226 and 226a as upper band rolls 26. Half of these (alternate pairs) are disposed substantially in line with corresponding rolls 26, and the intervening pairs are located opposite the spaces between rolls 26. This relation may be understood from a consideration of Figs. 3 and 6. The downwardly and upwardly moving courses of an endless blade running over a given roll 26 are separated and twisted through a quarter turn, and are run through the guide spaces s at the sides of the corresponding guide blocks pair 226, 226a. The direction of twist in each instance is of course such as to present the sharpened edge 20a of the blade toward the oncoming loaf. Each of the two oppositely moving courses of each blade thus has a turn or twist between the drum off which it runs and the slicing zone, this being the space defined by or between the two sets of spaced apart blade twisting means 226 and 226a, and another turn or twist between this slicing zone and the drum toward which the blade course runs. Within the slicing zone the two courses of each blade travel in what might be called parallel slicing planes spaced apart transversely by the desired thickness of a slice.

These twists are given the blades by the flat edge surfaces 250 of the guide blocks which bear against the side surfaces of the blades. Accordingly, there is considerable wear against these surfaces. Each block is therefore preferably formed of case hardened high carbon steel. In addition to this, each block may be used in turn in four different positions as the block wears. After a new block has worn to the extent where replacement would otherwise be required, it is simply turned over. It will be evident that the pressure of the twisted blades on the blocks will tend to wear non-corresponding areas on the two block surfaces defining each blade space s, assuming all blades to be twisted in the same direction, each twisted blade will press at one edge against the surface defining one side of the guide space while pressing at its opposite edge against the surface defining the opposite side of the guide space.

Accordingly, when a given block is turned over, top for bottom, without reversing ends, its previously worn area will not be the wear area in the new position. The guide block may then be reversed end for end, and later again top for bottom, giving in all four wear positions.

The rectangular bar 234 that backs up the back edges of the knives is also subject to wear by the rear knife edges, and is therefore also made of case hardened steel. This bar has two wear positions, being so dimensioned that it may, after wear has taken place, be removed and reassembled after rotation through 180°.

To avoid engagement between the twisted portions of the blades moving downwardly between outside drums 22 and 23 with drum 24 and inner rolls 26 which guide the upwardly moving sections of the blades, drum 24 and rolls 26 are set backwardly a short distance, as for instance about three sixteenths of an inch in the preferred form of my invention. This is preferably accomplished by placing the axes of drum 24 and rolls 26 a short distance back of the vertical plane indicated at S—S, see Fig. 17, joining the axes of outside drums 22 and 23.

The machine has so far been described with the endless blades arranged in the machine as indicated in Fig. 11, though certain definite advantages are gained by twisting or crossing the bands as indicated in Fig. 12. In these diagrammatic perspective Figures 11 and 12 the upper and lower outside drums are again indicated at 22 and 23, the lower inside drum at 24, and the row of tensioning rolls below drum 22 at 26a. Only one blade 20 is indicated in each instance, and for simplicity of illustration the cutting edge 20a of the blade is shown conventionally. It will be understood that this cutting edge may be formed in any manner desired, as for instance as indicated in Fig. 16, where a portion of a blade 20 is shown provided with a preferred form of cutting edge 20a.

In the band arrangement of Fig. 12, the band loop is passed over upper drum 22 as before, is then twisted through a half turn, and is then passed over lower drum 23. Each course of the blade then naturally has a quarter turn or twist of its own between the drum off which it is running and the slicing zone, and another quarter turn or twist, in the same direction, between the slicing zone and the drum toward which it travels. This threading arrangement brings the cutting edges 20a of both courses of the band again to a position directed toward the oncoming loaves, but the advantage in this arrangement of Fig. 12 is that when so twisted the normal position of the central portions of the two vertical courses of the endless blade is with its cutting edges directed toward the loaves, so that but little pressure is exerted by the flat sides of the blades on the blade twisting means, thus greatly relieving wear on the blade twisting means, as well as strain on the blades. It will be noted that in the arrangement of Fig. 12 the upper drum 22 and pressure roll 26 both rotate in a direction opposite to their directions of rotation as indicated in Figs. 2 and 11.

It will also be noted in Fig. 12, that each of the two courses of the blade crosses from one side of a blade supporting drum 22, to the opposite side of another blade supporting drum 23, so that the said two blade courses, and the cutting edges thereof, actually cross each other, when viewed in a direction parallel to the axes of blade supporting drums 22 and 23.

The machine is of course capable of being operated with the blades arranged either as in Fig. 11 or 12, and both are to be considered as coming within the scope of my invention, though from a consideration of wear, the arrangement of Fig. 12 may be preferable.

A means is provided for automatically opening an electric switch that controls the motor to stop the slicing machine in event one of the band blades breaks. For this purpose there is provided a switch control means, which in this particular embodiment of the invention includes shaft 300 mounted at one end on a depending crank arm 301 pivoted at 302 on a frame bracket 303, and being mounted at its opposite end on a depending crank arm 304 mounted on a shaft 305 rotatably mounted in a frame bracket 306 (see Figs. 3, 14 and 15). The hub of crank arm 304 has extending oppositely from the crank arm a perforated lug 310 receiving a bolt 311 which passes through a perforated lug 312 on bracket 306, the head of said bolt coming against lug 310, and a compression spring 313 being placed on the bolt between lug 312 and a nut 314 on the end of the bolt. Bell crank arms 114 stand normally against or adjacent shaft 300, with crank arms 301 and 304 in such position that lugs 310 and 312 are in engagement with one another. Crank arm shaft 305 carries a mercury switch 315, of conventional type, which when the parts are in the running position shown in Figs. 2, 3, 13 and 14, is tilted to position to close a circuit controlling motor 54. For instance, switch 315 may be in series with one of the electric current supply leads 316 serving motor 54 (see Fig. 15), the other supply lead being designated at 317.

Now if a blade should break, the corresponding bell crank 113 will, under the influence of spring 134, swing a short distance along a predetermined path in a clockwise direction, as viewed in Fig. 2, and the lower arm 114 of said bell crank will engage shaft 300 and move it forwardly, thereby rotating mercury switch shaft 305 to tilt or open the mercury switch to open the motor circuit, and stop the motor. In such operation bolt 311 moves rearwardly against its spring 313. When normal conditions are restored, spring 313 moves the bolt back to the position of Fig. 13, re-closing the mercury switch.

In the preferred form of the switch control means just described, it is apparent that shaft 300, extending transversely of the machine and across the path along which each bell crank 113 moves when its endless band blade breaks, is itself movable for opening the switch entirely independent of the movement of any of the bell cranks 113, or bell crank arms 114, or of any other part of the blade tensioning assembly of which, in this form of the invention, the bell crank is a part.

That is, the independently movable member 300 is positioned to intercept the predetermined path of each of the several blade tensioning assemblies, but is independent thereof so far as its switch opening movement is concerned, so that when the blade of any assembly breaks, that assembly, acting individually and independently of the others, and under impulse of its spring 134, moves itself along its said predetermined path and thereby moves the switch control means to open the switch and stop the motor without substantial interference from the other blade tensioning assemblies whose blades did not break. By this combination and arrangement of parts, the stopping of the motor is made quickly responsive to the breakage of any single endless band blade.

As a further measure, I preferably provide a brake which is automatically applied upon breakage of any one of the band blades. As shown in Fig. 2, a brake shoe 350 is engageable with the V-groove 50 of drum 23. This brake shoe is mounted on a brake arm 351 pivoted at 352 on a mounting 353 supported on the machine base. Pivotally connected at 354 to brake arm 351 is the movable core 355 of an electromagnet or solenoid 356, supported by bracket 357 extending from mounting 353. The brake is normally held applied by a compression spring 360 acting between the end of solenoid 356 and brake arm 351, and is released by movement of core 355 when the solenoid is energized. Solenoid 356 is included in the circuit 316, 317 controlled by switch 315 (see Fig. 15).

It will be evident that this brake is normally applied, but is held released by the solenoid whenever electric current is flowing through circuit 316, 317 to energize motor 54. When a band blade breaks, the resultant opening of switch 315 de-energizes electromagnet 356 and so effects application of the brake, which in the present illustrative embodiment of the invention is accomplished through the instrumentality of a spring. It will of course be understood that any means for opening switch 315, or for effecting application of the brake upon opening of switch 315, or still more broadly, upon breakage of any one of the multiplicity of band blades, comes within the broad scope of my invention.

Thus at any time a blade should break, the machine is stopped instantly, and whichever loaf is in the cutting position at the time of the break can be removed and discarded. This relieves uncertainty as to which loaves might have been in a position to receive a portion of the broken blade at the time of the break, and avoids the necessity of discarding a comparatively large number of loaves, as has been necessary in machines which are not stopped instantly upon breaking of a blade.

It is self evident that switch 315 controls the electric circuit to stop the motor, either by simply opening the circuit and allowing friction to rapidly stop the motor and connected parts without the intervention of any brake mechanism whatever; or the switch 315 can accomplish the same result by opening the circuit and allowing the brake somewhat more rapidly to stop the motor and parts.

The smooth cut and absence of tearing and production of crumbs in the band type of slicing machine are well known. The machine provided by the present invention has the advantages of simplicity, compactness, and ease of assembly and disassembly, and of conversion to different loaf sizes as well as different slice thicknesses. The machine is also advantageous in that the blades are individually adjustable as to tension, and need not all be of exactly the same length. If a blade should break, it may be spliced back together, and adjustment of the tensioning device for that individual blade which is then of reduced length, brings it back to proper tension. A still further noteworthy advantage in the machine is the provision for increasing the life of certain wear parts that engage the moving blades.

As previously indicated it is a feature of my invention that I use rotatable blade deflecting guide drums arranged to cooperate in bringing the two courses of substantially all the blades relatively close together throughout the space lying in a general way between the blade deflecting guide drums, to secure certain benefits previously mentioned.

Also, I wish to point out that which is self-evident, namely, that if the only object were to tension the blades, then only one blade deflecting drum 26a, Figs. 11 and 12, located only on one side of the slicing zone, would be sufficient, but since a primary object of this invention is to draw the blade courses relatively together in the vicinity of the slicing zone, I use a plurality of the blade deflecting guide drums distributed on both sides of the slicing zone.

Also, I wish to point out that by so locating the blade deflecting guide drums with relation to the blade supporting drums, that all the blade courses are guided to run on the same side of the plane that passes through the axes of the blade supporting drums, especially in the vicinity of the slicing zone, as indicated in Figs. 2, 11, 12 and 17, the structure of the machine is kept simple and the desired benefits of my invention can be obtained by comparatively few blade deflecting guide drums.

Also, as the blade deflecting guide drums 24 and 26a are set backwardly, toward the right in the accompanying drawings, it is evident that the benefits of my invention will be realized progressively in less degree.

In the form of my invention illustrated in Fig. 12, in which the cutting edges of the two courses of each blade cross each other and therefore form an angle of divergence 400 between the cutting edges of the two courses of each blade, I wish to point out that when the blade deflecting guide drums sufficiently deflect the blade courses so that said angle of divergence 400 (when viewed in a direction parallel to the axes of the blade supporting drums) is reduced to less than ten degrees, then the benefits of my invention in this crossed blade form, are substantially realized, although in practice I prefer to reduce this angle 400 to less than ten degrees by setting the blade deflecting guide drums as far to the left as possible, as shown in Fig. 2. In Fig. 12, angle 400 appears between the blade course that rises from drum 24 and the blade course that descends toward drum 23, and the same angle could be noticed above blade twisting means 226, except that the view is not suitably taken to clearly show the angle there. In neighboring Fig. 17, however, which is taken in a direction parallel to the axes of the blade supporting drums, and where for purposes of clearness, the cutting edge 20a alone is shown, this angle of blade divergence is clearly indicated at 400, as formed between the downwardly moving cutting edge 20ax and the upwardly moving cutting edge 20ay of the blade, this angle 400 being here plainly visible both above and below the blade twisting means 226 and 226a. In Fig. 17, angle 400 has been made as small as possible consistent with leaving it clearly distinguishable.

I also wish to point out that in that type of my invention illustrated in the drawings, because drums 22, 23, 24, and 26a, see Figs. 2, 11, 12 and 17, have their axes substantially parallel to each other, and because the axis of each such drum is a substantially continuous axis, and because the diameter of each such drum is a uniform diameter, substantially across the entire machine, it follows that all the courses comprising each of the two groups of corresponding courses across the machine, are treated and deflected substantially alike by the drums, and therefore, in the space lying in a general way between the blade deflecting guide drums, all those blade courses that run in the one direction are in line with one another when viewed in a direction parallel to the axes of the blade supporting drums, and all those blade courses that run in the other direction are in line with one another when viewed in a direction parallel to the axes of the blade supporting drums; and in the preferred form of my invention where the blade deflecting guide drums bring the two courses of each blade into the closest practical relation with each other, the two said groups of blade courses are thereby brought into substantially the same line with respect to each other when viewed in a direction parallel to the axes of said blade supporting drums, i. e., their cutting edges are in a common plane. In speaking of the cutting edge of the blade, I refer throughout this specification to the average or mean cutting edge, the undulations or scallops in edge 20a, Fig. 16, being disregarded.

The structure, advantages, and co-action of the various parts of my invention are now thought to be clear.

While I have now described and illustrated a present preferred embodiment of the invention, it will be understood this is for illustrative purposes only, and that various changes in design, structure and arrangement may be made without departing from the spirit and scope of the invention which is limited only by the terms of the appended claims.

Subject matter of invention disclosed, but not claimed in this application, is claimed in my co-pending application, Serial No. 207,931, filed May 14, 1938.

I claim:

1. In a slicing machine, the combination of spaced rotatably mounted blade supporting drums having substantially parallel axes, a plurality of endless band blades running about said blade supporting drums, and means for guiding all the courses of substantially all said endless band blades between said blade supporting drums to run in spaced parallel slicing planes with the cutting edges of all the courses of substantially all said blades approximately parallel to one another and approximately in a common plane that extends substantially parallel to the axes of said blade supporting drums, said means including rotatable blade deflecting guide drums spaced apart from each other and blade twisting means spaced apart from each other, said blade twisting means being spaced apart a sufficient distance to provide passage for the article to be sliced.

2. In a slicing machine, the combination of spaced rotatably mounted blade supporting drums having substantially parallel axes, a plurality of endless band blades running about said blade supporting drums, and means for guiding all the courses of substantially all said endless band blades between said blade supporting drums to run in spaced parallel slicing planes with the cutting edges of all the courses of substantially all said blades approximately parallel to one another and approximately in a common plane that extends substantially parallel to the axes of said blade supporting drums, said means including rotatable blade deflecting guide drums spaced apart from each other, also blade twisting means spaced apart from each other, said blade twisting means being spaced apart a sufficient distance to provide passage for the article to be sliced, and blade back-up means adapted to support the rearward edges of the blades in the general vicinity of said blade twisting means.

3. In a slicing machine, the combination of spaced rotatably mounted blade supporting drums having substantially parallel axes, a plurality of endless band blades running about said blade supporting drums, each of said blades having two blade courses running between said spaced blade supporting drums and each of said blades being so mounted about said spaced blade supporting drums that each of said two courses of each blade crosses from one side of one of the blade supporting drums to the opposite side of the other of the blade supporting drums about which the blade is mounted, and means for guiding all the courses of substantially all said endless band blades between said blade supporting drums to run in spaced parallel slicing planes with the cutting edges of all the courses of substantially all said blades approximately parallel to one another and approximately in a common plane, said means including rotatable blade deflecting guide drums spaced apart from each other and blade twisting means spaced apart from each other, said blade twisting means being spaced apart a sufficient distance to provide passage for the article to be sliced.

4. In a slicing machine, the combination of spaced rotatably mounted blade supporting drums having substantially parallel axes, a plurality of endless band blades running about said blade supporting drums, and means for guiding all the courses of substantially all said endless band blades between said blade supporting drums to run in spaced parallel slicing planes which are approximately at right angles to the axes of said blade supporting drums and with the cutting edges of all the courses of substantially all said blades approximately parallel to one another and approximately in a common plane, said means including rotatable blade deflecting guide drums spaced apart from each other and blade twisting means spaced apart from each other, said blade twisting means being spaced apart a sufficient distance to provide passage for the article to be sliced.

5. In a slicing machine, the combination of a plurality of rotatable blade supporting drums spaced apart from each other and having substantially parallel axes, a plurality of endless band blades mounted side by side about said spaced apart blade supporting drums, each of said blades having two blade courses running in a general way between said spaced apart blade supporting drums, blade twisting guide means spaced apart along said blade courses and contacting and twisting the said two courses of substantially all said blades into spaced parallel slicing planes, said blade twisting means being spaced apart a sufficient distance to provide passage for the article to be sliced, the blade course portions between said spaced apart blade twisting means comprising a slicing zone within which all the courses of substantially all said blades cooperate in cutting into a plurality of slices articles fed through said slicing zone in a direction parallel to said slicing planes and within which said slicing zone the blade courses that cut on opposite sides of the same slice run in opposite directions, and a plurality of rotatable blade deflecting guide drums spaced apart from each other and substantially deflecting said blades at places along the blades between said blade twisting means and each of said spaced apart blade supporting drums, said blade deflecting guide drums being located to cooperate in bringing the two courses of each blade relatively closer together and the cutting edges of all the courses of substantially all said blades approximately parallel throughout said slicing zone.

6. In a slicing machine, the combination of a plurality of rotatable blade supporting drums spaced apart from each other and having substantially parallel axes, a plurality of endless band blades mounted side by side about said spaced apart blade supporting drums, each of said blades having two blade courses running in a general way between said spaced apart blade supporting drums, blade twisting guide means spaced apart along said blade courses and contacting and twisting the said two courses of substantially all said blades into spaced parallel slicing planes, said blade twisting means being spaced apart a sufficient distance to provide passage for the article to be sliced, the blade course portions between said spaced apart blade twisting means comprising a slicing zone within which all the courses of substantially all said blades cooperate in cutting into a plurality of slices articles fed through said slicing zone in a direction parallel to said slicing planes and within which said slicing zone the blade courses that cut on opposite sides of the same slice run in opposite directions, blade back-up means located in the vicinity of said blade twisting means and adapted to co-act with the rear edges of said blades to support the blades, and a plurality of rotatable blade deflecting guide drums spaced apart from each other and substantially deflecting said blades at places along the blades between said blade twisting means and each of said spaced apart blade supporting drums, said blade deflecting guide drums being located to cooperate in bringing the two courses of each blade relatively closer together and the cutting edges of all the courses of substantially all said blades approximately parallel throughout said slicing zone.

7. In a slicing machine, the combination of a plurality of rotatable blade supporting drums spaced apart from each other and having substantially parallel axes, a plurality of endless band blades mounted side by side about said spaced apart blade supporting drums, each of said blades having two blade courses running in a general way between said spaced apart blade supporting drums, blade twisting means spaced apart along said blade courses and contacting and twisting the said two courses of substantially all said blades into spaced parallel slicing planes, said blade twisting means being spaced apart a sufficient distance to provide passage for the article to be sliced, the blade course portions between said spaced apart blade twisting means comprising a slicing zone within which all the courses of substantially all said blades co-operate in cutting into a plurality of slices articles fed through said slicing zone in a direction parallel to said slicing planes and within which said slicing zone the blade courses that cut on opposite sides of the same slice run in opposite directions, and a plurality of rotatable blade deflecting guide drums spaced apart from each other and substantially deflecting said blades at places along the blades between said blade twisting means and each of said spaced apart blade supporting drums, said blade deflecting guide drums being located to cooperate in bringing the two courses of each blade relatively close together and the cutting edges of all the courses of substantially all said blades approximately parallel throughout said slicing zone, substantially all said courses that run in the one direction through said slicing zone being at all places in said slicing zone approximately in line with one another when viewed in a direction parallel to the axes of said blade supporting drums, and substantially all the other courses that run in the other direction through said slicing zone being at all places in said slicing zone approximately in line with one another when viewed in a direction parallel to the axes of said blade supporting drums.

8. In a slicing machine, the combination of a plurality of rotatable blade supporting drums spaced apart from each other and having substantially parallel axes, a plurality of endless band blades mounted side by side about said spaced apart blade supporting drums, each of said blades having two blade courses running in a general way between said spaced apart blade supporting drums, blade twisting means spaced apart along said blade courses and contacting and twisting the said two courses of substantially all said blades into spaced parallel slicing planes, said blade twisting means being spaced apart a sufficient distance to provide passage for the article to be sliced, the blade course portions between said spaced apart blade twisting means comprising a slicing zone within which all the courses of substantially all said blades cooperate in cutting into a plurality of slices articles fed through said slicing zone in a direction parallel to said slicing planes and within which said slicing zone the blade courses that cut on opposite sides of the same slice run in opposite directions, blade back-up means located in the vicinity of said blade twisting means and adapted to co-act with the rear edges of said blades to support the blades, and a plurality of rotatable blade deflecting guide drums spaced apart from each other and substantially deflecting said blades at places along the blades between said blade twisting means and each of said spaced apart blade supporting drums, said blade deflecting guide drums being located to cooperate in bringing the two courses of each blade relatively close together and the cutting edges of all the courses of substantially all said blades approximately parallel throughout said slicing zone, substantially all said courses that run in the one direction through said slicing zone being at all places in said slicing zone approximately in line with one another when viewed in a direction parallel to the axes of said blade supporting drums, and substantially all the other courses that run in the other direction through said slicing zone being at all places in said slicing zone approximately in line with one another when viewed in a direction parallel to the axes of said blade supporting drums.

9. In a slicing machine, the combination of a plurality of rotatable blade supporting drums spaced apart from each other and having substantially parallel axes, a plurality of endless band blades mounted side by side about said spaced apart blade supporting drums, each of said blades having two blade courses running in a general way between said spaced apart blade supporting drums, blade twisting means spaced apart along said blade courses and contacting and twisting the said two courses of substantially all said blades into spaced parallel slicing planes, said blade twisting means being spaced apart a sufficient distance to provide passage for the article to be sliced, the blade course portions between said spaced apart blade twisting means comprising a slicing zone within which all the courses of substantially all said blades cooperate in cutting into a plurality of slices articles fed through said slicing zone in a direction parallel to said slicing planes and within which said slicing zone the blade courses that cut on opposite sides of the same slice run in opposite directions, and of rotatable blade deflecting guide drums spaced apart from each other and substantially deflecting said blades at places along the blades between said blade twisting means and each of said spaced apart blade supporting drums, said blade deflecting guide drums being located to cooperate in bringing the two courses of each blade relatively close together and all the courses of substantially all said blades within the slicing zone onto the same side of a plane passing through said substantially parallel axes of said spaced apart blade supporting drums, substantially all said courses that run in the one direction through said slicing zone being at all places in said slicing zone approximately in line with one another when viewed in a direction parallel to the axes of said blade supporting drums, and substantially all the other courses that run in the other direction through said slicing zone being at all places in said slicing zone approximately in line with one another when viewed in a direction parallel to the axes of said blade supporting drums.

10. In a slicing machine, the combination of a plurality of rotatable blade supporting drums spaced apart from each other and having substantially parallel axes, a plurality of endless band blades mounted side by side about said spaced apart blade supporting drums, each of said blades having two blade courses running in a general way between said spaced apart blade supporting drums, blade twisting means spaced apart along said blade courses and contacting and twisting the said two courses of substantially all said blades into spaced parallel slicing planes, said blade twisting means being spaced apart a sufficient distance to provide passage for the article to be sliced, the blade course portions between said spaced apart blade twisting means comprising a slicing zone within which all the courses of substantially all said blades cooperate in cutting into a plurality of slices articles fed through said slicing zone in a direction parallel to said slicing planes and within which said slicing zone the blade courses that cut on opposite sides of the same slice run in opposite directions, blade back-up means located in the vicinity of said blade twisting means and adapted to co-act with the rear edges of said blades to support the blades, and a plurality of rotatable blade deflecting guide drums spaced apart from each other and substantially deflecting said blades at places along the blades between said blade twisting means and each of said spaced apart blade supporting drums, said blade deflecting guide drums being located to cooperate in bringing the two courses of each blade relatively close together and all the courses of substantially all said blades within the slicing zone onto the same side of a plane passing through said substantially parallel axes of said spaced apart blade supporting drums, substantially all said courses that run in the one direction through said slicing zone being at all places in said slicing zone approximately in line with one another when viewed in a direction parallel to the axes of said blade supporting drums, and substantially all the other courses that run in the other direction through said slicing zone being at all places in said slicing zone approximately in line with one another when viewed in a direction parallel to the axes of said blade supporting drums.

11. In a slicing machine, the combination of a plurality of rotatable blade supporting drums spaced apart from each other and having substantially parallel axes, a plurality of endless band blades mounted side by side about said spaced apart blade supporting drums, each of said blades having two blade courses running in a general way between said spaced apart blade supporting drums, and each of said blades being so mounted about said spaced apart blade supporting drums that each of said two courses of each blade crosses from one side of one of the blade supporting drums to the opposite side of the other of the blade supporting drums about which the blade is mounted to thereby cause the cutting edges of said two courses of each blade to cross and to make an angle of divergence between said cutting edges of said two courses of each blade, blade twisting means spaced apart along said blade courses and contacting and twisting the said two courses of substantially all said blades into spaced parallel slicing planes, said blade twisting means being spaced apart a sufficient distance to provide passage for the article to be sliced, the blade course portions between said spaced apart blade twisting means comprising a slicing zone within which all the courses of substantially all said blades cooperate in cutting into a plurality of slices articles fed through said slicing zone in a direction parallel to said slicing planes and within which said slicing zone the blade courses that cut on opposite sides of the same slice run in opposite directions, and a plurality of rotatable blade deflecting guide drums spaced apart from each other and substantially deflecting all of said blades at places along the blades between said blade twisting means and each of said spaced apart blade supporting drums, said blade deflecting guide drums being located to cooperate in bringing the two courses of each blade substantially and relatively closer together along the entire space lying generally between said spaced apart blade deflecting guide drums, to thereby reduce the angle of divergence made between the cutting edges of said two courses of each blade to less than ten degrees when viewed in a direction parallel to the axes of said blade supporting drums.

12. In a slicing machine, the combination of a plurality of rotatable blade supporting drums spaced apart from each other and having substantially parallel axes, a plurality of endless band blades mounted side by side about said spaced apart blade supporting drums, each of said blades having two blade courses running in a general way between said spaced apart blade supporting drums, and each of said blades being so mounted about said spaced apart blade supporting drums that each of said two courses of each blade crosses from one side of one of the blade supporting drums to the opposite side of the other of the blade supporting drums about which the blade is mounted to thereby cause the cutting edges of said two courses of each blade to cross and to make an angle of divergence between said cutting edges of said two courses of each blade, blade twisting means spaced apart along said blade courses and contacting and twisting the said two courses of substantially all said blades into spaced parallel slicing planes, said blade twisting means being spaced apart a sufficient distance to provide passage for the article to be sliced, the blade course portions between said spaced apart blade twisting means comprising a slicing zone within which all the courses of substantially all said blades cooperate in cutting into a plurality of slices articles fed through said slicing zone in a direction parallel to said slicing planes and within which said slicing zone the blade courses that cut on opposite sides of the same slice run in opposite directions, blade back-up means located in the vicinity of said blade twisting means and adapted to co-act with the rear edges of said blades to support the blades, and a plurality of rotatable blade deflecting guide drums spaced apart from each other and substantially deflecting all of said blades at places along the blades between said blade twisting means and each of said spaced apart blade supporting drums, said blade deflecting guide drums being located to cooperate in bringing the two courses of each blade substantially and relatively closer together along the entire space lying generally between said spaced apart blade deflecting guide drums, to thereby reduce the angle of divergence made between the cutting edges of said two courses of each blade to less than ten degrees when viewed in a direction parallel to the axes of said blade supporting drums.

13. In a slicing machine, the combination of spaced rotatably mounted drums having approximately parallel axes, a plurality of endless band blades running about said drums, and means for guiding all the courses of substantially all said endless band blades between said drums to run in spaced parallel slicing planes with the cutting edges of all the courses of substantially all said blades approximately parallel to one another and approximately in a common plane that extends approximately parallel to the axes of said drums the guided runs of the blades in said parallel relation providing a slicing zone of sufficient extent in a direction longitudinal of the blades for the article to be sliced.

14. In a slicing machine, the combination of a plurality of endless band blades, mounting means for operatively mounting said endless band blades side by side transversely of the machine, said mounting means including a plurality of individually movable self-actuating blade tensioning assemblies mounted side by side transversely of the machine, there being one such assembly for each of said endless band blades and each such assembly including as a part thereof a rotatable drum continually tensioning its endless band blade, the tensioned blade being the only restraint normally preventing the movement of said self-actuating blade tensioning assembly and said assembly when freed from said restraint being adapted to move in a predetermined path independently of the other said assemblies, an electric motor for driving said plurality of endless band blades, an electric circuit for operating said motor, a switch for controlling said circuit to stop said motor when the switch is opened, and switch control means extending transversely of the machine and intercepting the said predetermined path in which each of said assemblies move when freed from the restraint of its band blade, said switch control means being movable to open said switch and stop said motor independently of said assemblies, but each of said assemblies being adapted by its movement in its said predetermined path on breakage of its band blade to individually cooperate with and move said switch control means to open said switch and stop said motor.

15. In a slicing machine, the combination of two spaced revolvable blade supporting drums, a plurality of endless band blades mounted side by side about said drums, stationary frame structure adjacent both ends of each of said drums, and two separable drum supporting means for each of said two drums, the first of said two drum supporting means for each drum comprising a non-rotatable shaft one end of which is securely fastened to said frame structure that is adjacent to one end of its drum and the other end of which said non-rotatable shaft is free of the aforesaid frame structure, each of said two drums being rotatably mounted on its said non-rotatable shaft and the latter being of itself adequate to support its drum in substantial parallel relation to the other drum even in the absence of the second said drum supporting means, the second said drum supporting means of each drum being normally supported by the stationary frame structure adjacent to the other end of its drum and being normally in supporting engagement with the said free end of the non-rotatable shaft of its drum to thereby more firmly support its drum but said second drum supporting means being separable from said free end of the non-rotatable shaft of its drum to thereby provide clearance around the corresponding ends of both said drums to permit an endless band blade to pass between the last said ends of both said drums and said stationary frame structure adjacent thereto so that said endless band blade may pass into normal operating position about both said drums.

WILLIAM WALTER HARTMAN.

CERTIFICATE OF CORRECTION.

Patent No. 2,143,242.     January 10, 1939.

WILLIAM WALTER HARTMAN.

It is hereby certified that error appears in the printed specification of the above numbered patent requiring correction as follows: Page 9, second column, line 24, claim 9, after the word "and" insert a plurality; and that the said Letters Patent should be read with this correction therein that the same may conform to the record of the case in the Patent Office.

Signed and sealed this 4th day of April, A. D. 1939.

Henry Van Arsdale (Seal)     Acting Commissioner of Patents.

dependently of the other said assemblies, an electric motor for driving said plurality of endless band blades, an electric circuit for operating said motor, a switch for controlling said circuit to stop said motor when the switch is opened, and switch control means extending transversely of the machine and intercepting the said predetermined path in which each of said assemblies move when freed from the restraint of its band blade, said switch control means being movable to open said switch and stop said motor independently of said assemblies, but each of said assemblies being adapted by its movement in its said predetermined path on breakage of its band blade to individually cooperate with and move said switch control means to open said switch and stop said motor.

15. In a slicing machine, the combination of two spaced revolvable blade supporting drums, a plurality of endless band blades mounted side by side about said drums, stationary frame structure adjacent both ends of each of said drums, and two separable drum supporting means for each of said two drums, the first of said two drum supporting means for each drum comprising a non-rotatable shaft one end of which is securely fastened to said frame structure that is adjacent to one end of its drum and the other end of which said non-rotatable shaft is free of the aforesaid frame structure, each of said two drums being rotatably mounted on its said non-rotatable shaft and the latter being of itself adequate to support its drum in substantial parallel relation to the other drum even in the absence of the second said drum supporting means, the second said drum supporting means of each drum being normally supported by the stationary frame structure adjacent to the other end of its drum and being normally in supporting engagement with the said free end of the non-rotatable shaft of its drum to thereby more firmly support its drum but said second drum supporting means being separable from said free end of the non-rotatable shaft of its drum to thereby provide clearance around the corresponding ends of both said drums to permit an endless band blade to pass between the last said ends of both said drums and said stationary frame structure adjacent thereto so that said endless band blade may pass into normal operating position about both said drums.

WILLIAM WALTER HARTMAN.

CERTIFICATE OF CORRECTION.

Patent No. 2,143,242.  January 10, 1939.

WILLIAM WALTER HARTMAN.

It is hereby certified that error appears in the printed specification of the above numbered patent requiring correction as follows: Page 9, second column, line 24, claim 9, after the word "and" insert a plurality; and that the said Letters Patent should be read with this correction therein that the same may conform to the record of the case in the Patent Office.

Signed and sealed this 4th day of April, A. D. 1939.

Henry Van Arsdale (Seal)  Acting Commissioner of Patents.